(12) United States Patent
Cech et al.

(10) Patent No.: US 7,212,895 B2
(45) Date of Patent: May 1, 2007

(54) MAGNETIC SENSOR

(75) Inventors: Leonard S. Cech, Brighton, MI (US);
W. Todd Watson, Belleville, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 310 days.

(21) Appl. No.: 10/905,219

(22) Filed: Dec. 21, 2004

(65) Prior Publication Data
US 2005/0143944 A1    Jun. 30, 2005

Related U.S. Application Data

(60) Provisional application No. 60/481,821, filed on Dec. 21, 2003.

(51) Int. Cl.
*B60R 22/00* (2006.01)

(52) U.S. Cl. .......................... 701/45; 701/46

(58) Field of Classification Search ................ 701/45, 701/46, 47, 48, 1, 36; 340/522; 324/500, 324/522
See application file for complete search history.

(56) References Cited

U.S. PATENT DOCUMENTS

| | | | |
|---|---|---|---|
| 1,813,746 A | 7/1931 | Kinsley | 324/243 |
| 2,552,722 A | 5/1951 | King | 264/1 |
| 3,659,197 A | 4/1972 | Alley | 324/51 |
| 3,945,459 A | 3/1976 | Oishi et al. | 180/274 |
| 4,087,782 A | 5/1978 | Oishi et al. | 180/271 |
| 4,178,979 A | 12/1979 | Birat | 164/49 |
| 4,446,741 A | 5/1984 | Sirokorad et al. | 73/654 |
| 4,531,091 A | 7/1985 | Kusenberger et al. | 324/242 |
| 4,561,314 A | 12/1985 | Alley et al. | 73/862.69 |
| 4,630,229 A | 12/1986 | D'Hondt | 364/726 |
| 4,651,093 A | 3/1987 | Detriche et al. | 324/232 |
| 4,802,368 A | 2/1989 | Nordvall | 73/862.69 |

(Continued)

FOREIGN PATENT DOCUMENTS

EP    0 453 824 A1    10/1991

(Continued)

OTHER PUBLICATIONS

Kwun, H., "Magnetostrictive Sensors Technology", reprinted from Technology Today, Mar. 1995, pp. 3-7.

(Continued)

*Primary Examiner*—Richard M. Camby
(74) *Attorney, Agent, or Firm*—Raggio & Dinnin, P.C.

(57) ABSTRACT

A magnetic flux is sensed within a gap at a first location between two portions of a vehicle body/structure and a signal generated responsive thereto controls an element of the vehicle, wherein the magnetic flux is responsive to a disturbance of the vehicle body/structure. In one embodiment, the first location is proximate to the A-pillar, B-pillar or C-pillar. In another embodiment, at least a portion of the magnetic flux is generated by a coil at a different second location. A gap coil is located within a gap between portions of the vehicle body/structure for generating or sensing magnetic flux. A plurality of gap coils of various orientations provide for multi-axis sensitivity. In another aspect, a magnetic crash sensing system comprises a first coil at a first location, and a plurality of magnetic sensors at a plurality of corresponding second locations.

20 Claims, 8 Drawing Sheets

U.S. PATENT DOCUMENTS

| | | | |
|---|---|---|---|
| 4,823,621 A | 4/1989 | Sobel | 73/862.69 |
| 4,855,677 A | 8/1989 | Clark, Jr. et al. | 324/238 |
| 4,866,418 A | 9/1989 | Dobler et al. | 340/429 |
| 4,893,077 A | 1/1990 | Auchterlonie | 324/208 |
| 5,007,295 A | 4/1991 | Gustafsson et al. | 73/862.69 |
| 5,041,769 A | 8/1991 | Iwai | 318/254 |
| 5,068,608 A | 11/1991 | Clark, Jr. | 324/220 |
| 5,134,371 A | 7/1992 | Watanabe | 324/252 |
| 5,144,846 A | 9/1992 | Klauber et al. | 73/862.336 |
| 5,177,370 A | 1/1993 | Meister | 307/10.1 |
| 5,182,513 A | 1/1993 | Young et al. | 324/232 |
| 5,359,286 A | 10/1994 | Kaiser et al. | 324/207.2 |
| 5,399,968 A | 3/1995 | Sheppard et al. | 324/242 |
| 5,437,197 A | 8/1995 | Uras et al. | 73/862.69 |
| 5,559,431 A | 9/1996 | Sellen | 324/202 |
| 5,580,084 A | 12/1996 | Gioutsos | 280/735 |
| 5,636,863 A | 6/1997 | Reid et al. | 280/735 |
| 5,646,613 A | 7/1997 | Cho | 340/903 |
| 5,707,076 A | 1/1998 | Takahashi | 280/735 |
| 5,739,757 A | 4/1998 | Gioutsos | 340/667 |
| 5,747,696 A | 5/1998 | Kwun et al. | 73/728 |
| 5,767,766 A | 6/1998 | Kwun | 340/436 |
| 5,783,871 A | 7/1998 | LeMense | 307/10.1 |
| 5,793,200 A | 8/1998 | Berrill | 324/207.2 |
| 5,793,206 A | 8/1998 | Goldfine et al. | 324/242 |
| 5,895,439 A | 4/1999 | Fisher et al. | 702/36 |
| 5,966,011 A | 10/1999 | Goldfine et al. | 324/242 |
| RE36,427 E | 12/1999 | Gioutsos | 280/735 |
| 6,005,392 A | 12/1999 | Patzwaldt | 324/329 |
| 6,018,980 A | 2/2000 | Kimura et al. | 73/12.04 |
| 6,039,345 A | 3/2000 | Cech et al. | 280/735 |
| 6,203,060 B1 | 3/2001 | Cech et al. | 280/735 |
| 6,252,393 B1 | 6/2001 | Hedengren | 324/202 |
| 6,288,536 B1 | 9/2001 | Mandl et al. | 324/225 |
| 6,288,537 B1 | 9/2001 | Viertl et al. | 324/230 |
| 6,317,048 B1 | 11/2001 | Bomya et al. | 340/573.1 |
| 6,329,910 B1 | 12/2001 | Farrington | 340/436 |
| 6,351,120 B2 * | 2/2002 | Goldfine | 324/262 |
| 6,407,660 B1 | 6/2002 | Bomya | 340/436 |
| 6,407,669 B1 * | 6/2002 | Brown et al. | 340/572.1 |
| 6,433,688 B1 | 8/2002 | Bomya | 340/573.1 |
| 6,552,662 B1 | 4/2003 | Bomya et al. | 340/572.1 |
| 6,583,616 B1 | 6/2003 | Bomya | 324/207.17 |
| 6,586,926 B1 | 7/2003 | Bomya | 324/207.17 |
| 6,587,048 B1 | 7/2003 | Bomya | 340/573.1 |
| 6,631,776 B1 | 10/2003 | Bomya | 180/169 |
| 6,777,927 B1 | 8/2004 | Bomya | 324/207.17 |
| 6,812,697 B2 | 11/2004 | McKnight et al. | 324/262 |
| 7,084,617 B2 * | 8/2006 | Ozaki et al. | 324/117 H |
| 2002/0003421 A1 | 1/2002 | Kawata et al. | 324/233 |
| 2002/0126004 A1 | 9/2002 | Gioutsos et al. | 340/438 |
| 2004/0056652 A1 | 3/2004 | Bomya | 324/207.17 |
| 2004/0061617 A1 | 4/2004 | Gioutsos et al. | 340/667 |
| 2004/0075429 A1 | 4/2004 | Hiroshima | 324/242 |
| 2005/0007108 A1 | 1/2005 | Dogaru | 324/235 |
| 2005/0093540 A1 | 5/2005 | Merrick et al. | 324/239 |
| 2005/0096881 A1 | 5/2005 | Watson et al. | 702/190 |
| 2005/0143944 A1 | 6/2005 | Cech et al. | 702/115 |

FOREIGN PATENT DOCUMENTS

JP     56-157802     5/1981

OTHER PUBLICATIONS

Uras, M., "Signal Detection Methods for Magnetostrictive Sensors", 970604, reprinted from *Sensors and Actuators* 1997, SP-1220, Society of Automotive Engineers, Feb. 24, 1997, pp. 23-33.

technical paper eddyc.pdf downloaded from the internet at http://joe.buckley.net/papers on Sep. 8, 2003, 7 pp.

Internet web pages at http://www.ndt-ed.org/EducationResources/CommunityCollege/EddyCurrents/cc_ec_index.htm, downloaded on Jun. 17, 2004 and Oct. 13, 2005, 118 pp.

* cited by examiner

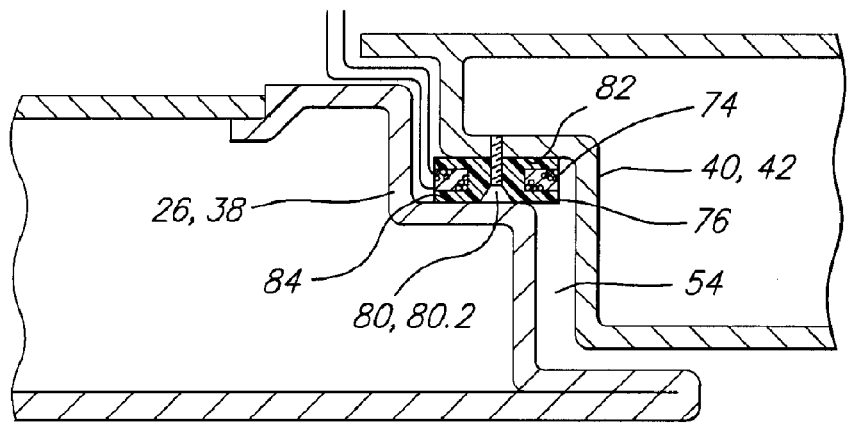
FIG. 5.
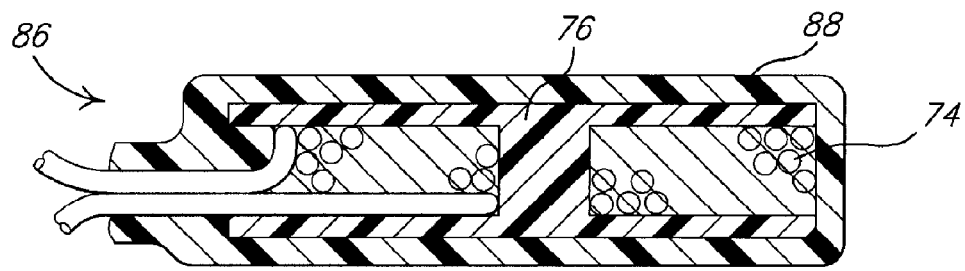
FIG. 6.
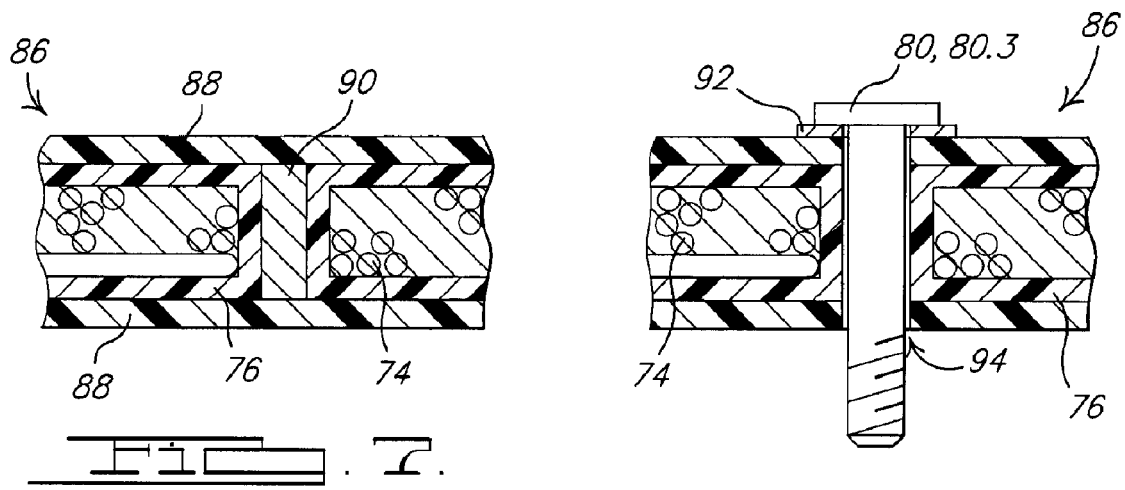
FIG. 7.
FIG. 8.

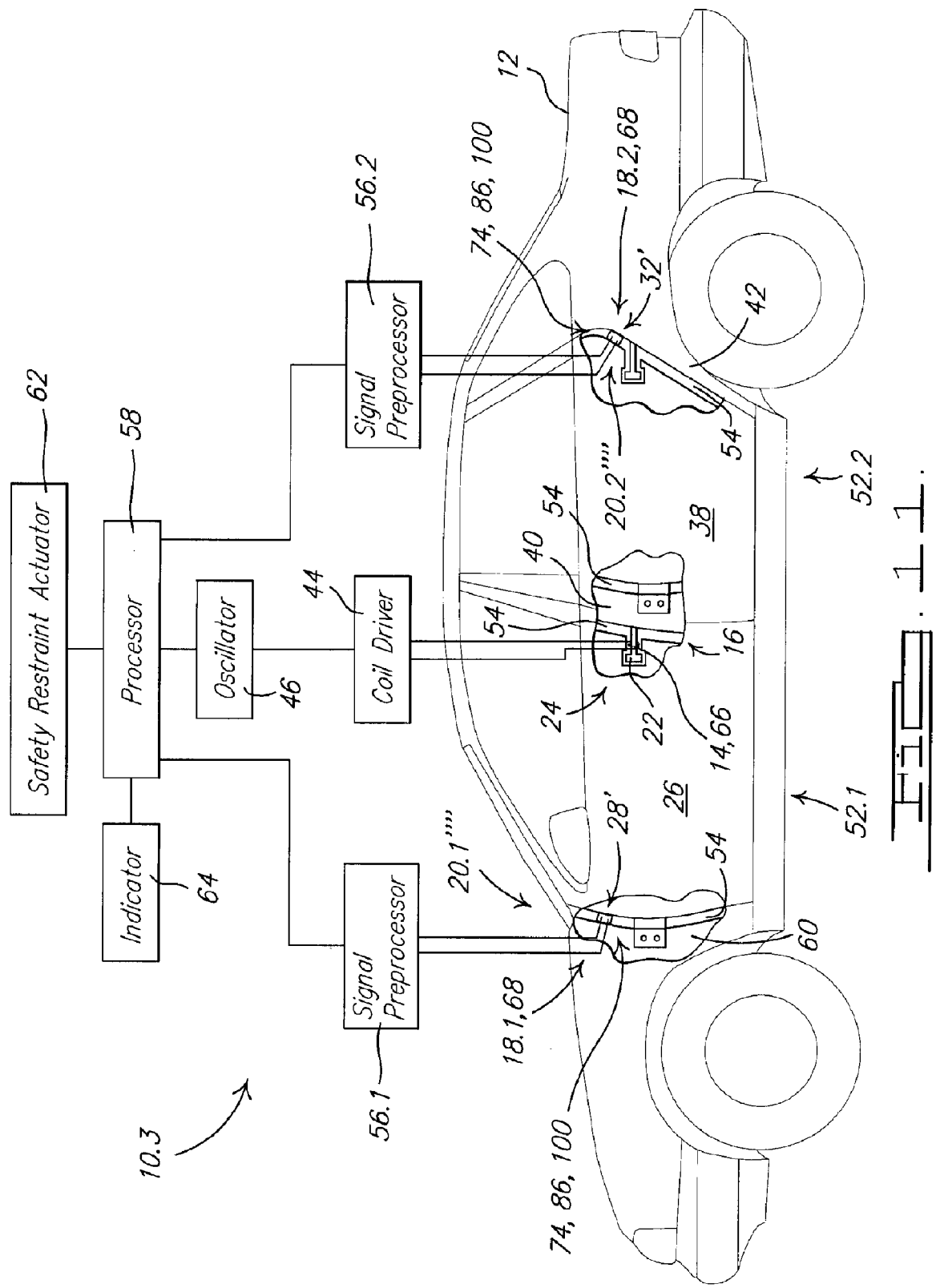

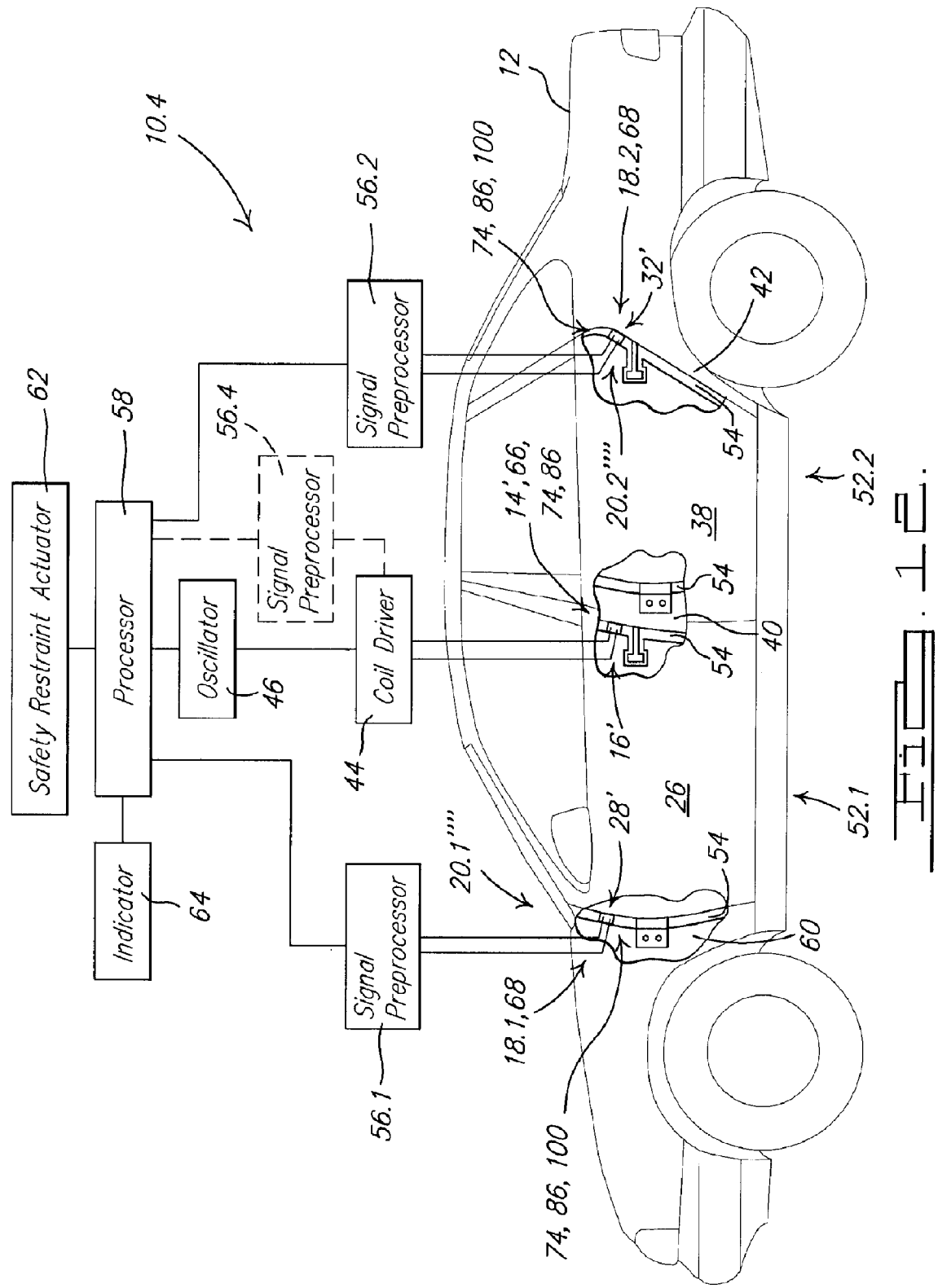

MAGNETIC SENSOR

CROSS-REFERENCE TO RELATED APPLICATIONS

The instant application claims the benefit of prior U.S. Provisional Application Ser. No. 60/481,821 filed on Dec. 21, 2003, which is incorporated herein in its entirety by reference. U.S. application Ser. No. 10/666,165, filed on Sep. 19, 2003, entitled Magnetic Sensor, is incorporated herein in its entirety by reference. U.S. application Ser. No. 10/946,151 filed on Sep. 20, 2004 entitled Magnetic Crash Sensing Method, is also incorporated herein in its entirety by reference.

BRIEF DESCRIPTION OF THE DRAWINGS

FIG. 5 illustrates a coil mounted so as to provide for sensing a door opening condition;

FIG. 6 illustrates an encapsulated coil assembly;

FIG. 7 illustrates a portion of a coil assembly incorporating a magnetically permeable core;

FIG. 8 illustrates a portion of a coil assembly adapted for mounting with a fastener;

FIG. 11 illustrates a schematic block diagram of a third embodiment of a magnetic crash sensing system in a vehicle;

FIG. 12 illustrates a schematic block diagram of a fourth embodiment of a magnetic crash sensing system in a vehicle;

DESCRIPTION OF EMBODIMENT(S)

Figure 1:
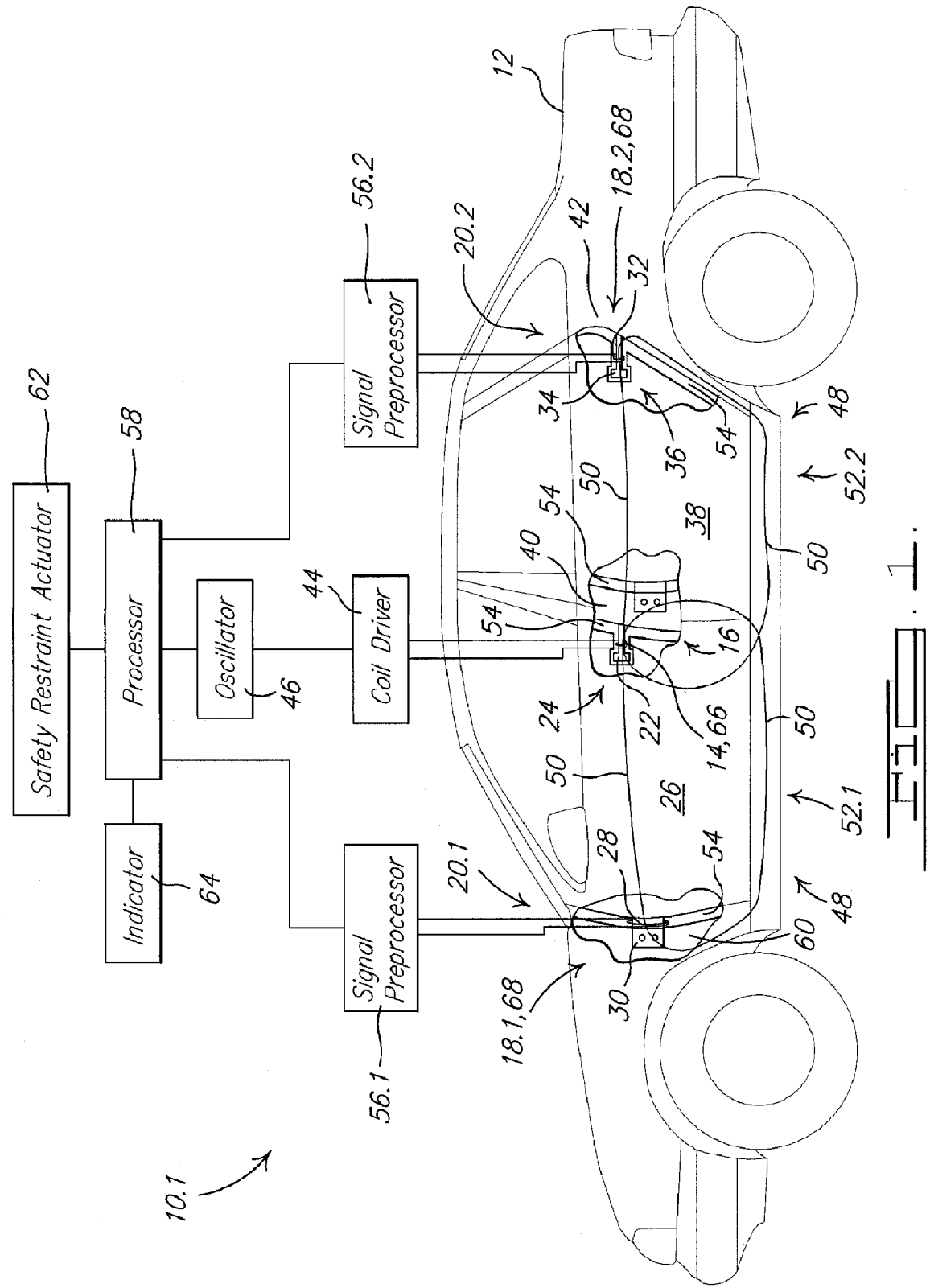
FIG. 1 illustrates a schematic block diagram of a first embodiment of a magnetic crash sensing system in a vehicle.

Referring to FIG. 1, a first embodiment of a magnetic crash sensing system 10.1 incorporated in a vehicle 12 comprises a first coil 14 at a corresponding first location 16 of the vehicle 12, and a plurality of magnetic sensors 18.1, 18.2 at a corresponding plurality of second locations 20.1, 20.2 of the vehicle 12. For example, in the first embodiment illustrated in FIG. 1, the first coil 14 is located around the striker 22 of the door latch assembly 24 of the front door 26, and the magnetic sensors 18.1, 18.2 comprise a second coil 28 around a hinge 30 of the front door 26, and a third coil 32 around a striker 34 of the door latch assembly 36 of the rear door 38, wherein the striker 22 of the door latch assembly 24 of the front door 26 is operatively coupled to the B-pillar 40 of the vehicle 12, and the striker 34 of the door latch assembly 36 of the rear door 38 is operatively coupled to the C-pillar 42 of the vehicle 12. The first coil 14 is operatively coupled to a coil driver 44, which is in turn operatively coupled to an oscillator 46, wherein an oscillatory signal from the oscillator 46 is applied by the coil driver 44 so as to cause an associated current in the first coil 14, responsive to which the first coil 14 generates a magnetic field 48 comprising magnetic flux 50 in associated first 52.1 and second 52.2 magnetic circuits. The second 28 and third 32 coils surround metallic elements of the associated first 52.1 and second 52.2 magnetic circuits, and the magnetic flux 50 propagates within the associated magnetically permeable material of the first 52.1 and second 52.2 magnetic circuits and flows through the second 28 and third 32 coils surrounding the associated magnetically permeable material. The second 28 and third 32 coils generate voltage signals responsive to the oscillating magnetic flux 50, or component thereof, directed along the axis of the second 28 and third 32 coils respectively, in accordance with Faraday's law of magnetic induction. The doors 24, 38 are isolated from the remainder of the vehicle 12, e.g. the frame, by the gaps 54 therebetween, except where the hinges 30 and door latch assemblies 24, 36 provide relatively lower reluctance paths therebetween.

The oscillator 46 generates a oscillating signal, for example, having either a sinusoidal, square wave, triangular or other waveform shape, of a single frequency, or a plurality of frequencies that are either stepped, continuously swept or simultaneous. The frequency is adapted so that the resulting magnetic field 48 is conducted through the first 52.1 and second 52.2 magnetic circuits with sufficient strength so as to provide a useful signal level from the associated magnetic sensors 18.1, 18.2 that cooperate therewith. For example, the oscillation frequency would typically be less than about 50 KHz for a steel structure, e.g. 10 to 20 KHz in one embodiment. The magnetic field 48 is responsive to the reluctance R of the associated first 52.1 and second 52.2 magnetic circuits, which is affected by a crash involving the elements thereof and/or the gaps 54 therein.

The magnetic field 48 is sensed by the magnetic sensors 18.1, 18.2, and a signal therefrom is conditioned by associated signal preprocessors 56.1, 56.2 which are operatively coupled to a processor 58. For example, each signal preprocessor 56.1, 56.2 demodulates the signal from the associated magnetic sensor 18.1, 18.2 with an associated demodulator, and converts from analog to digital form with an associated analog-to-digital converter which is sampled and input to the processor 58. The signal preprocessors 56.1, 56.2 may also provide for amplification. Changes to the magnetic field 48 at a particular location in the first 52.1 and second 52.2 magnetic circuits propagate therewithin at the speed of light and are seen therethroughout. Accordingly, the magnetic field 48 sensed by the magnetic sensors 18.1, 18.2 contains information about the nature of the remainder of the magnetic circuit, including the front 26 and rear 38 doors and the adjacent A-pillar 60, B-pillar 40 and C-pillar 42, any of which could be involved in, or affected by, a side-impact crash.

The first embodiment of the magnetic crash sensing system 10.1 can operate in a variety of modes, for example, as disclosed in U.S. Pat. Nos. 6,777,927, 6,586,926, or 6,407,660; or U.S. application Ser. Nos. 10/666,165 or 10/946,151; each of which is incorporated in its entirety by reference herein. Accordingly, the magnetic crash sensing system 10.1 provides for controlling a safety restraint actuator 62, e.g. side air bag system, responsive to the detection of a crash, and/or provides for activating an indicator 64, e.g. warning lamp, warning message, or audible alarm, e.g. responsive to a door open or partially latched condition, or a prediction of an impending crash responsive to the interaction of an approaching vehicle with a proximity field of the magnetic crash sensing system 10.1.

The arrangement of the first coil 14 as a transmitter coil 66 at a central location, e.g. proximate to the B-pillar 40, and the plurality of magnetic sensors 18.1, 18.2, e.g. receiver coils 68, in cooperation therewith at relatively distal locations relative thereto, e.g. proximate to the A-pillar 60 and C-pillar 42 respectively, provides for a magnetic crash sensing system 10.1 that is responsive to disturbances affecting either the front 26 or rear 38 doors on a side of the vehicle, but requiring only a single transmitter coil 66, e.g. the first coil 14 as presently illustrated in FIG. 1. Alternatively the magnetic crash sensing system 10.1 could be adapted so that either the second 28 or third 32 coils acted as the transmitting coil 62, with the remaining coils acting as associated magnetic sensors 18.1, 18.2.

Figure 2:
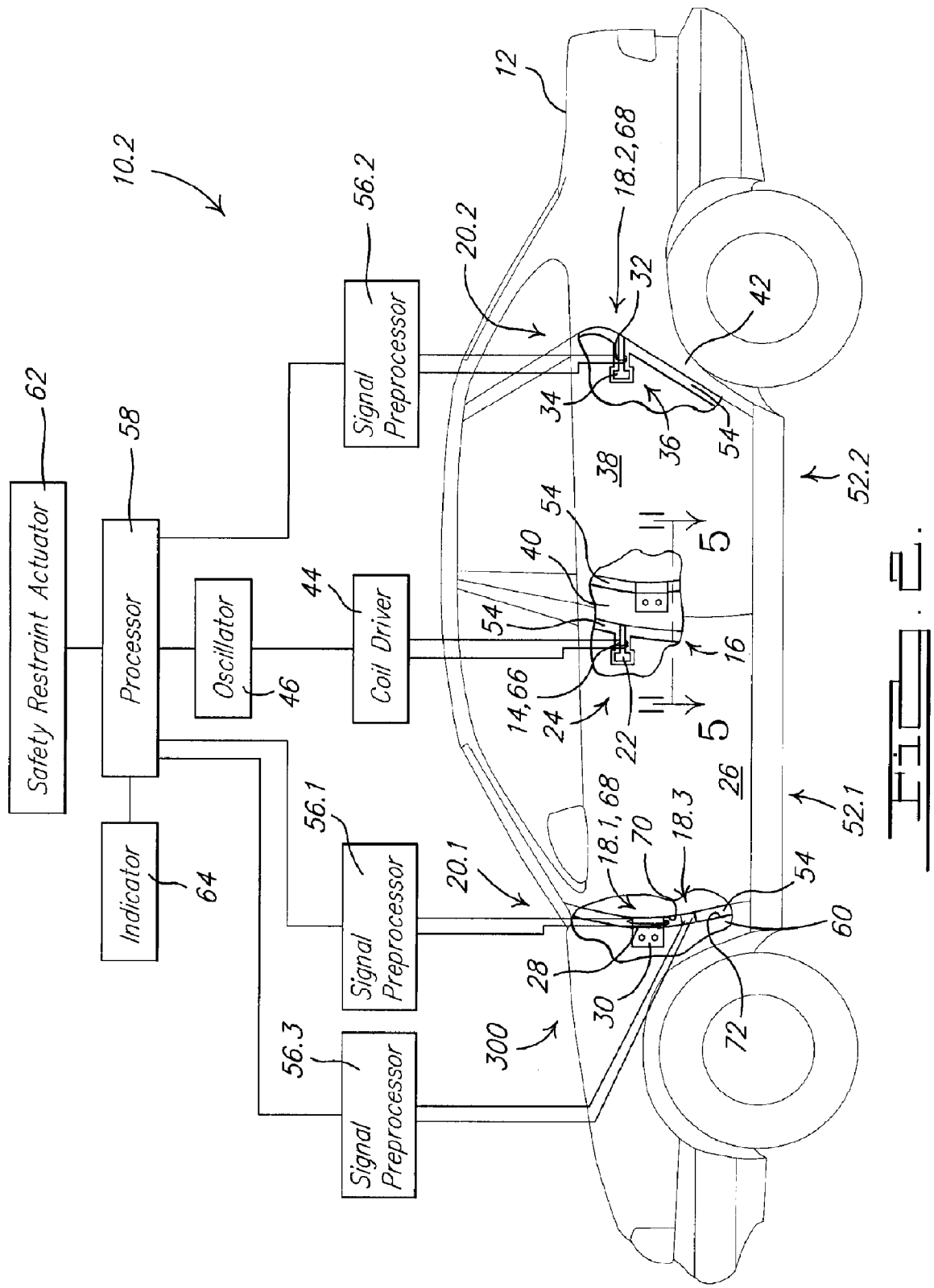
FIG. 2 illustrates a schematic block diagram of a second embodiment of a magnetic crash sensing system in a vehicle.

Referring to FIG. 2, a second embodiment of a magnetic crash sensing system 10.2 incorporates all of the features of the first embodiment 10.1 described hereinabove, and further comprises at least one additional magnetic sensor 18.3 within a gap 54 between the fixed body structure and a door, e.g. the front door 26. Although FIG. 2 illustrates the additional magnetic sensor 18.3 located between the front edge 70 of the front door 26 and an adjacent edge 72 of the A-pillar 60, the additional magnetic sensor 18.3 could be located elsewhere in the gap 54 between either the front 26 or rear 38 door and the fixed body structure of the vehicle 12. The additional magnetic sensor 18.3 is operatively coupled to an associated signal preprocessor 56.3 which is in turn operatively coupled to the processor 58, so as to provide a signal that can be used either for safing or as a primary crash sensing signal.

Generally, the mechanical components of the first 52.1 and second 52.2 magnetic circuits in which the transmitter 66 and receiver 68 coils are placed are constructed for other functions. For example, the hinges 30 and strikers 22, 34 are designed with primary functions, e.g. to facilitate occupant entrance, exit and vehicle locking, which components are generally constructed according to associated specifications that govern strength, geometry, material and design constraints. Accordingly, configuring the transmitter 66 or receiver 68 coils, that would encircle the magnetically permeable members, can be otherwise challenging and subject to constraints on coil shape, turn count, connector access and wire gauge that might otherwise limit the optimization of the transmitter 66 or receiver 68 coils for their primary function to generate or sense time varying magnetic fields. Also, given a wide range of hinge 30 and striker 22, 34 designs, it may be difficult to standardize the transmitter 66 or receiver 68 coils for a wide range of vehicle platforms if the transmitter 66 or receiver 68 coils are to encircle metal, which can increase the cost of these and associated components for a given vehicle platform. Furthermore, coils intended to be assembled around existing components may need to be installed prior to the final assembly of that component in the vehicle which necessitates close cooperation with the supplier of that component so as to provide for the integration of the coil therewith. For example, for many hinges 30, inclusion of a coil thereon would require that the coil undergo an E-coat process along with the hinge 30.

Figure 3:
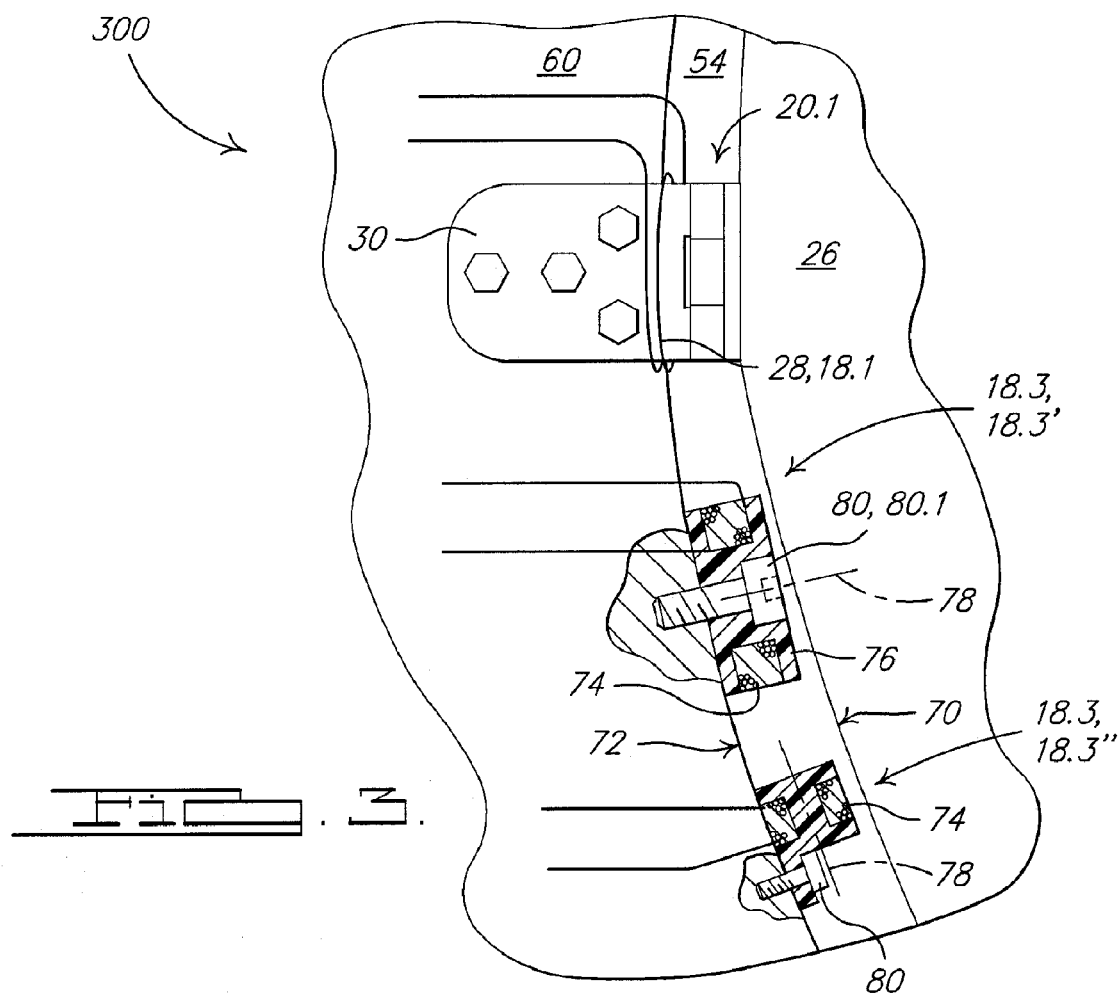
FIG. 3 illustrates a detailed view of several coils from the second embodiment illustrated in FIG. 2, and illustrates several coil embodiments.

Referring to FIG. 3, the fragmentary view 300 of the A-pillar 60 and front door 26 from FIG. 2 is illustrated in greater detail, illustrating several embodiments of the additional magnetic sensor 18.3, 18.3', 18.3" in greater detail, each comprising a gap coil 74 that is sufficiently small to be located within the gap 54 between the A-pillar 60 and the front door 26. The gap coil 74 of the additional magnetic sensor 18.3, 18.3', 18.3" is not necessarily constrained to surround existing magnetic permeable components of the first 52.1 or second 52.2 magnetic circuits, so as to provide for placement of the gap coil 74 in locations without being adversely constrained by the geometries or functions of proximate elements of the vehicle 12. The gap coil 74 is wound around an associated spool 76 which is fastened to the fixed structure of the vehicle, e.g. the edge 72 of the A-pillar 60 facing the front edge 70 of the front door 26. Generally, the gap coil 74 can be used as either a transmitter coil 66 or a receiver coil 68, although in the second embodiment of a magnetic crash sensing system 10.2, the gap coil 74 is used as a receiver coil 68 responsive to the magnetic flux 50 within the gap 54, e.g. resulting from changes in the proximity field of magnetic flux 50 and/or to eddy currents that propagate through the surrounding metal structures. The gap coil 74 can be oriented to as to optimize the signal-to-noise ratio of the signal generated thereby responsive to a crash or other disturbance to be monitored.

For example, in a first magnetic sensor 18.3', the axis 78 of the gap coil 74 is substantially perpendicular to the edge 72 of the A-pillar 60 and to the front edge 70 of the front door 26 when the front door 26 is closed. The first magnetic sensor 18.3' is attached to the A-pillar 60 with a fastener 80 through the associated spool 76, e.g. a socket head screw 80.1 through a counterbore in the spool 76. The magnetic permeability of the fastener 80 can be adapted in accordance with the sensing or field generating requirements of the associated gap coil 74. For example, the fastener 80 associated with the first magnetic sensor 18.3' is substantially aligned with the axis 78 of the gap coil 74, so that a fastener 80 of a material with a relatively high permeability, e.g. carbon steel or electrical steel, will tend to concentrate the magnetic flux 50 through the gap coil 74, whereas a fastener 80 of a material with a relatively low permeability, e.g. stainless steel, aluminum or brass, will tend to emulate an air core so that the magnetic sensor 18.3' has less of a tendency to perturb the associated first 52.1 or second 52.2 magnetic circuit. As another example, in a second magnetic sensor 18.3", the axis 78 of the gap coil 74 is substantially parallel to the edge 72 of the A-pillar 60 and to the front edge 70 of the front door 26, so as to be substantially aligned with the length of the associated gap 54. The second magnetic sensor 18.3' is shown attached to the A-pillar 60 with a fastener 80 through a flange that depends from the associated spool 76.

Figure 4:
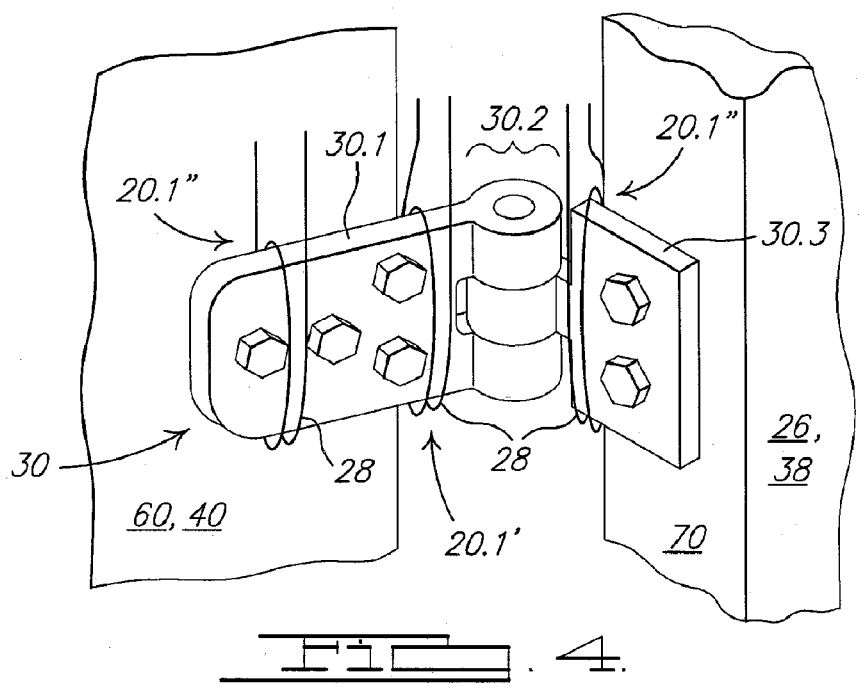
FIG. 4 illustrates various locations for a coil around a door hinge.

FIG. 3 also illustrates the second coil 28 around a hinge 30 of the front door 26. Referring to FIG. 4, the second coil 28 can be located at various second locations 20.1', 20.1", 20.1'" relative to the hinge 30. For example, in one embodiment, the second location 20.1' is on around a portion of the hinge plate 30.1 that attaches to the fixed vehicle structure, e.g. the A-pillar 60 or B-pillar 40, at a location between the A-pillar 60 or B-pillar 40 and the hinge joint 30.2. In another embodiment, the second location 20.1" is on around a portion of the hinge plate 30.1 that attaches to the fixed vehicle structure, e.g. the A-pillar 60 or B-pillar 40, at a location where the hinge plate 30.1 is bolted to the A-pillar 60 or B-pillar 40. In yet another embodiment, the second location 20.1'" is on around a portion of the hinge plate 30.3 that attaches to the front 26 or rear 38 door, at a location between the front edge 70 of the front 26 or rear 38 door and the hinge joint 30.2.

Referring to FIG. 5, a gap coil 74 may be mounted on the B-pillar 40 or C-pillar 42 on an outward facing surface 82 in the gap 54 between the outward facing surface 82 and a corresponding proximate inward facing surface 84 of the front 26 or rear 38 door respectively. In the embodiment illustrated in FIG. 5, the gap coil 74 is secured to the outward facing surface 82 with a flat head screw 80.2 through the spool 76 around which the coil is wound. The gap coil 74 illustrated in FIG. 5 is responsive to changes in reluctance of the associated first 52.1 or second 52.2 magnetic circuit responsive to the door opening state of the associated front 26 or rear 38 door and accordingly can be used to generate a signal indicative thereof, e.g. so as to provide for discriminating between a closed door, a partially latched door and an open door.

Referring to FIG. 6, a gap coil assembly 86 comprises a gap coil 74 wound around a spool 76, both of which are encapsulated in an encapsulant 88, e.g. a silicone potting compound, so as mitigate against environmentally induced degradation. The gap coil 74 for example, is wound of wire, e.g. 20 to 50 gauge enamel coated conductive wire, e.g. copper or aluminum. The spool 76 is, for example, made of a relatively rigid material such as plastic or aluminum.

Referring to FIG. 7, the gap coil assembly 86 can further comprise a core 90 of a material having relatively high magnetic permeability such as ferrite, mu-metal, or amorphous metal, e.g. METGLAS®.

The gap coil assemblies 86 illustrated in FIGS. 6 and 7 can be mounted, for example, by bonding or clamping. Referring to FIG. 8, the gap coil assembly 86 is mounted with a fastener 80, e.g. a cap screw 80.3 and washer 92, through a central mounting hole 94 in the spool 76. The material and dimensions of the fastener 80 would be selected according to the particular application. A material having relatively high magnetic permeability such as carbon steel or electrical steel could be used to concentrate the associated magnetic flux 50 through the gap coil 74, whereas a material of relatively low magnetic permeability such as aluminum, brass or stainless steel could be used to emulate an air core, thereby having less influence on the inherent flow of magnetic flux 50 across the associated gap 54 within which the gap coil assembly 86 is located.

Figure 9:
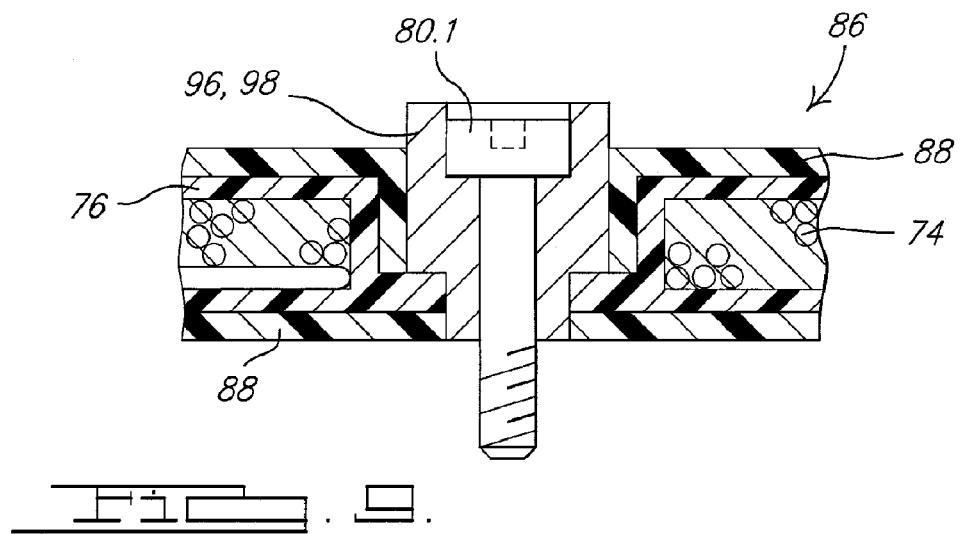
FIG. 9 illustrates a portion of a coil assembly adapted for mounting with a fastener, further comprising a magnetically permeable core.

Referring to FIG. 9, the gap coil assembly 86 is mounted with a fastener 80, e.g. a socket head screw 80.1, and further incorporates a magnetically permeable core 96 comprising a shouldered sleeve 98 that is recessed within the central mounting hole 94 in the spool 76. For example, the magnetically permeable core 96 can comprise either carbon steel, electrical steel, mu-metal, ferrite, or amorphous metal, e.g. METGLAS®. The length of the shouldered sleeve 98 can be adjusted in relation to the associated gap 54 in which the gap coil assembly 86 is mounted depending upon the extent of associated magnetic focusing required.

Figure 10:
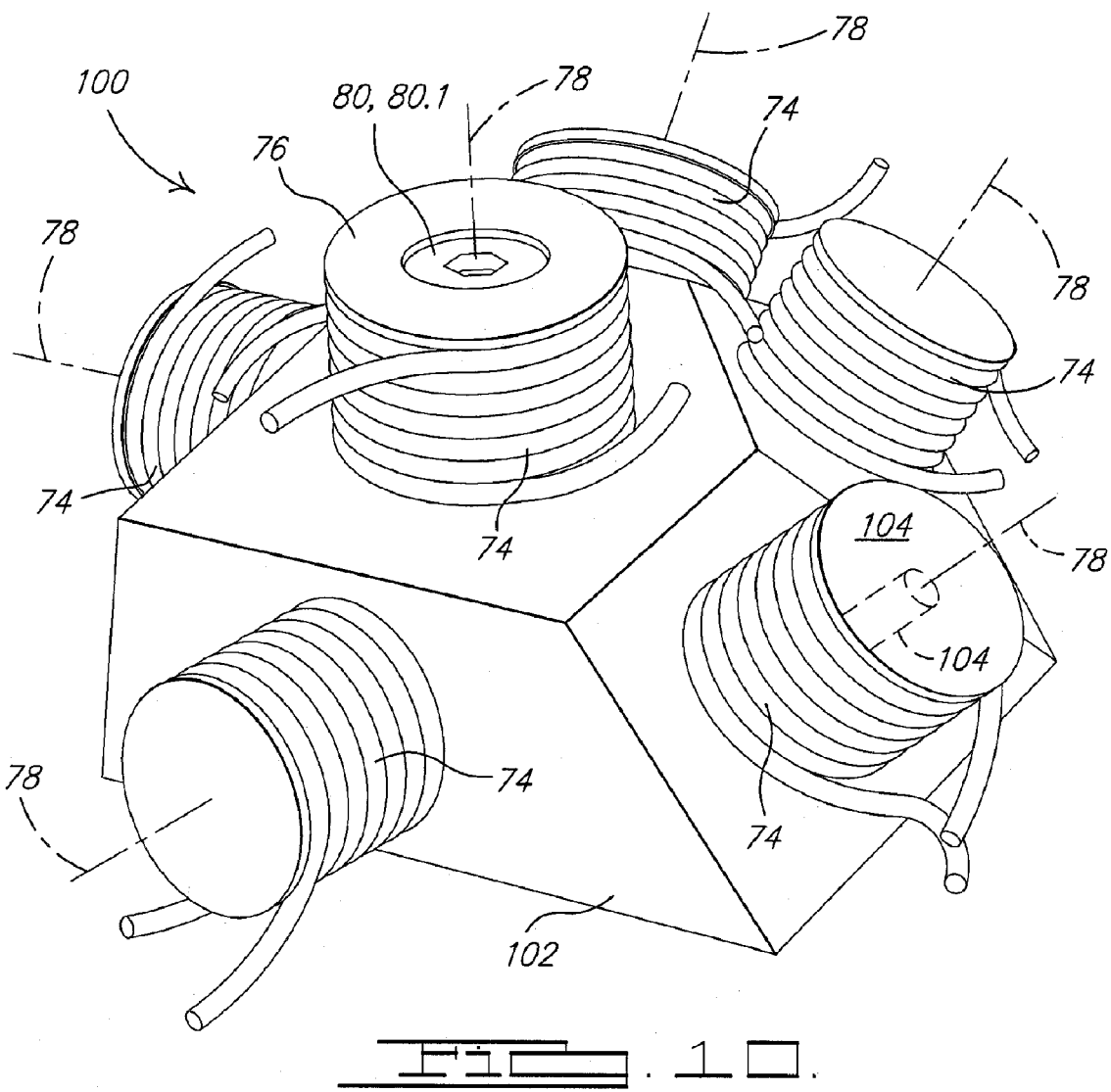
FIG. 10 illustrates a coil assembly comprising a plurality of coils arranged in a variety of orientations.

Referring to FIG. 10, a multi-axis gap coil assembly 100 comprises a plurality of gap coils 74 arranged on a central hub 102 wherein the axis 78 of each gap coil 74 is oriented in a different direction so as to provide for sensitivity to a corresponding component of the magnetic field 48 in that direction. The multi-axis gap coil assembly 100 is mounted with a fastener 80, e.g. a socket head screw 80.1, recessed in a spool 76 of one of the gap coils 74 and through the central hub 102. The individual gap coils 74 can be either preassembled and attached to the central hub 102, or wound around corresponding spool portions 104 that are attached to, or an integral part of, the central hub 102. For example, the central hub 102 and associated spool portions 104 could be plastic injection molded as a single part. The material used to construct the central hub 102 can be of relatively low magnetic permeability, e.g. plastic or aluminum, in applications for which the associated magnetic flux 50 need not be concentrated, and of a material of relatively higher magnetic permeability, e.g. ferrite, carbon steel, electrical steel or mu-metal, in applications for which it is beneficial to concentrate the associated magnetic flux 50 proximate to the associated gap coils 74. The multi-axis gap coil assembly 100 is illustrated with six gap coils 74, three oriented in orthogonal relation to one another, and the remaining three oriented obliquely relative thereto. It should be understood that this arrangement of gap coils 74 is principally to illustrate a variety of possible arrangements, and should not be taken to mean that the multi-axis gap coil assembly 100 must have that number of gap coils 74, or gap coils 74 arranged as so illustrated. More particularly, the multi-axis gap coil assembly 100 would have at least two gap coils 74 oriented with associated axes 78 thereof in different directions, so as to provide for multi-axis magnetic field sensitivity within a gap 54 between body elements of the vehicle 12.

Generally, the shape, size, gauge, and number of turns of a gap coil 74 is not limiting, but can instead be adapted or optimized for a particular application or configuration, e.g. the gap coil 74 can adapted to resonate at a particular frequency, to fit within a particular gap 54, or to influence the reluctance of the associated magnetic circuit 52.1, 52.2 in a particular way. For example, it has been beneficial to operate the gap coil 74 away from resonance so as to provide for a relatively flat frequency response thereof. The gap coil 74 can be developed and manufactured in accordance with any of a wide range of known coil design and manufacturing processes, and can be made small with any of a wide range of known connector and mounting configurations that would be selected or adapted for a particular mounting position and location in a given vehicle platform.

A plurality of individual gap coils 74 can be connected a common cable harness that is adapted to provide for the placement of the individual gap coils 74 at the respective magnetic sensor locations with separation therebetween so as to provide for improved sensing coverage area and magnetic flux discrimination, thereby providing for safing, redundancy, and/or improved event discrimination at comparable or reduced cost relative to coils that must otherwise be adapted to conform to existing vehicle hardware, e.g. hinges 30 or strikers 22, 34. The gap coils 74 are beneficially small, self contained, easily mounted, and provide some level of redundancy in the associated magnetic crash sensing system. The gap coils 74 can be adapted to include proximate electrical components—e.g. resistors, capacitors, reference inductors, IC, amplifiers, A/D, etc.—if necessary to improve the function thereof.

Referring to FIG. 11, a third embodiment of a magnetic crash sensing system 10.3 is the same as the first embodiment 10.1 except for the magnetic sensors 18.1, 18.2, which in the third embodiment 10.3 are first 28' and second 32' gap coils located at corresponding second locations 20.1'''', 20.2'''' in the respective gaps 54 between the A-pillar 60 and the front door 26, and between the rear door 38 and the C-pillar 42 respectively, wherein the first 28' and second 32' gap coils are each in accordance with the gap coils 74, gap coil assemblies 86 or multi-axis gap coil assembly 100 as disclosed herein.

Referring to FIG. 12, a fourth embodiment of a magnetic crash sensing system 10.4 is the same as the third embodiment 10.3 except that the first coil 14 is replaced with a corresponding first coil 14' located at corresponding first location 16' in the respective gap 54 between the front door 26 and the B-pillar 40, wherein the first coil 14' is accordance with the gap coils 74, gap coil assemblies 86 or mutli-axis gap coil assembly 100 as disclosed herein. Accordingly, the fourth embodiment of a magnetic crash sensing system 10.4 incorporates gap coils 74 throughout, the location of which in the associated gaps 54 is not otherwise constrained by existing vehicle hardware. The fourth embodiment of a magnetic crash sensing system 10.4 may be further adapted so that the coil driver 44 provides a measure of voltage across, current through, and/or power absorbed by the first coil 14', which is operatively coupled through a signal preprocessor 56.3 to the processor 58, for example, either so as to provide for magnetic crash sensing responsive to the self-inductance of the first coil 14', e.g. in accordance with the teachings of U.S. Pat. No. 6,587,048; or so as to provide for magnetic crash sensing using a time domain reflectometry technique, e.g. in accordance with the teachings of U.S. Pat. No. 6,583,616; each of which above referenced patents are incorporated in its entirety by reference herein.

Figures 13A, 13B:
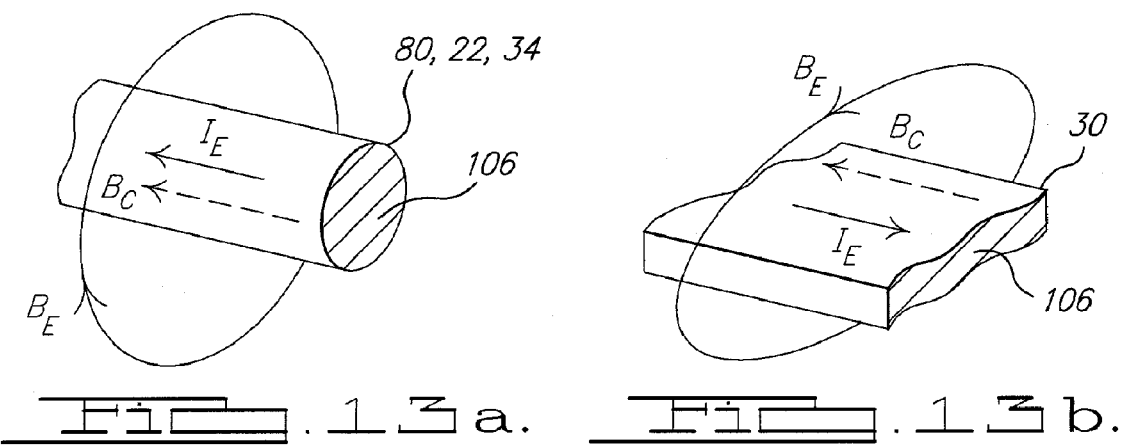
FIGS. 13a and 13b illustrate eddy currents, associated magnetic fields and axial magnetic fields in various ferromagnetic elements.
Figure 14:
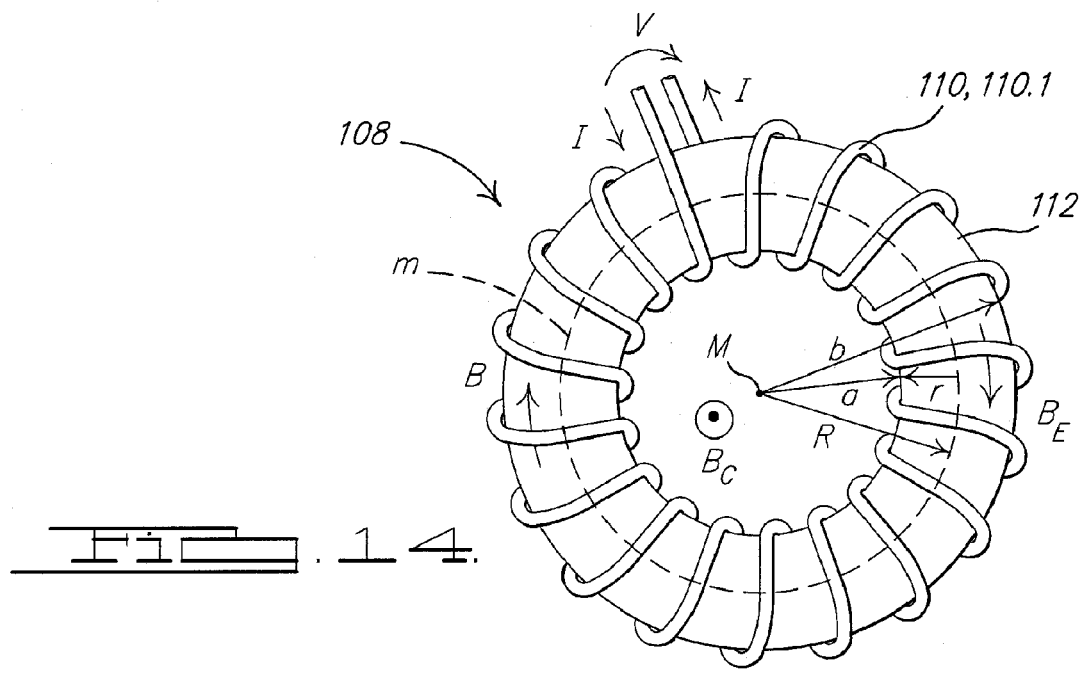
FIG. 14 illustrates a toroidal helical coil.
Figure 15:
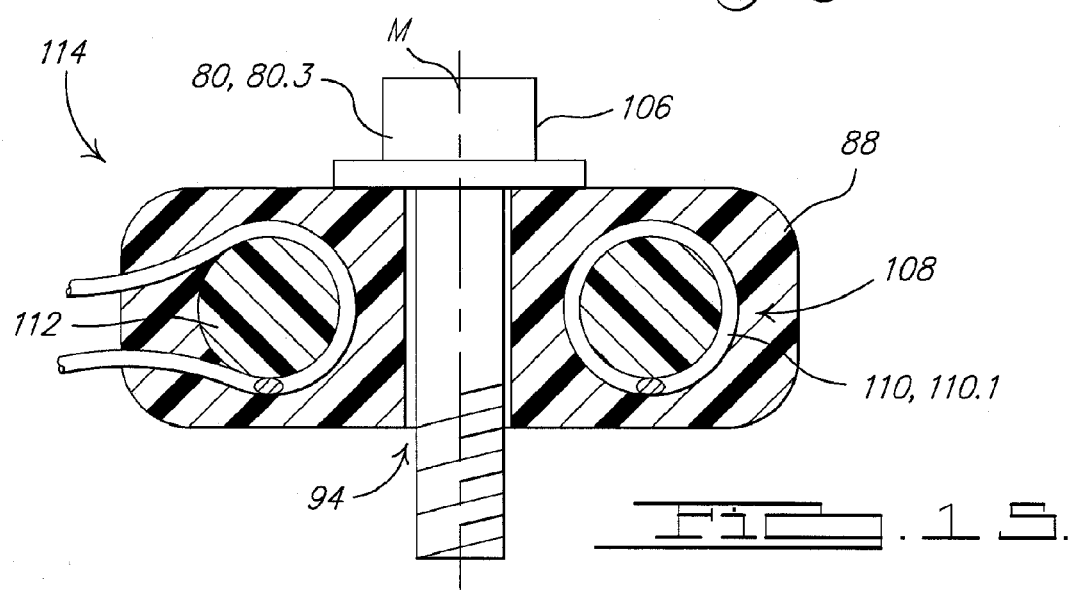
FIG. 15 illustrates a toroidal helical coil assembly.

Referring to FIGS. 13a and 13b, modeling and test results suggest that eddy currents $I_E$ are produced on the surface of steel pins or fasteners 80, strikers 22, 34, and hinges 30, wherein the eddy currents $I_E$ oscillate longitudinally along the associated steel core 106, producing an associated circumferential magnetic field $B_E$ surrounding the axes of the associated steel core 106. Referring to FIGS. 14 and 15, a toroidal helical coil 108 provides for generating a voltage signal V responsive to the associated oscillating circumferential magnetic field $B_E$ in accordance with Faraday's Law, responsive to which an associated current signal I is generated when the toroidal helical coil 108 is connected to an associated circuit, e.g. a signal preprocessor 56.1, 56.2, 56.3. The toroidal helical coil 108 comrpises a conductive path 110, e.g. a winding of conductive wire 110.1, e.g. copper or aluminum wire, around a toroidal core 112. Although the toroidal core 112 is illustrated in FIGS. 14 and 15 as having a circular shape (FIG. 14) and a uniform circular cross section (FIG. 15)—i.e doughnut shaped—, in general the, the toroidal core 112 can have any closed shape with any cross-sectional shape, either uniform or not. For example, the toroidal core 112 could have a rectangular cross-section, similar to that of a washer. The toroidal core 112 comprises a major axis M and a minor axis m, wherein the conductive path 110 makes at least one turn around the minor axis m, and at least one turn around the major axis M. For example, in the embodiment illustrated in FIG. 14, the conductive path 110 makes a plurality of turns around the minor axis m, and a single turn around the major axis M. The at least one turn around the minor axis m provides for generating a component of the voltage signal V responsive to an oscillating circumferential magnetic field $B_E$, and the at least one turn around the major axis M provides for generating a component of the voltage signal V responsive to an oscillating axial magnetic field $B_C$, the latter of which is illustrated in FIGS. 13a and 13b. Accordingly, the toroidal helical coil 108 can be used to sense both axial $B_C$ and circumferential $B_E$ magnetic fields. The doughnut-shaped toroidal core 112 illustrated in FIGS. 14 and 15 comprises a major radius R, a minor radius r, and an associated outside b and inside a radii and a minor diameter a, and may be constructed of either a ferromagnetic or a non-ferromagnetic material, depending upon the application, i.e. whether or not it is necessary to concentrate circumferential magnetic flux within the toroidal core 112. Any of the above described magnetic sensors 18.1, 18.2, 18.3, 18.3', 18.3" may incorporate a toroidal helical coil 108 instead of or in addition to the associated coil 28, 32, 68, 74. For example, referring to FIG. 15, a toroidal helical coil assembly 114 comprises a toroidal helical coil 108 encapsulated in an encapsulant 88 about a central mounting hole 94 adapted to receive an associated fastener 80, e.g. a cap screw 80.3. The modeling and testing done with a toroidal helical coil 108 suggests that the eddy currents $I_E$ (and therefore the associated circumferential magnetic field $B_E$) are substantially enhanced when the steel core 106 associated with the toroidal helical coil 108 is electrically connected to the front 26 or rear 38 doors and/or the vehicle frame, whereby an electrical connection to both, e.g. via a hinge 30, is beneficial. Tests have indicated that a stronger signal may be obtained when using a toroidal helical coil 108 instead of a circular wound gap coil 74 at a location otherwise suitable for a gap coil assembly 86.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. A method of providing for sensing a magnetic perturbation of a vehicle, comprising:
   providing for sensing a magnetic flux within a gap at at least one first location between two portions of a body or structure of the vehicle, wherein said magnetic flux is responsive to a disturbance of said body or structure of said vehicle;
   providing for generating at least one signal responsive to the operation of sensing said magnetic flux; and
   providing for controlling an element of the vehicle responsive to said signal.

2. A method of providing for sensing a magnetic perturbation of a vehicle as recited in claim 1, wherein the operations of sensing said magnetic flux and generating said at least one signal responsive thereto comprise placing at least one first coil within said gap so as to receive said magnetic flux, and generating said signal with said at least one first coil responsive to a change in said magnetic flux.

3. A method of providing for sensing a magnetic perturbation of a vehicle as recited in claim 2, wherein at least one axis of a corresponding said at least one first coil is oriented substantially perpendicular to a surface bounding said gap.

4. A method of providing for sensing a magnetic perturbation of a vehicle as recited in claim 2, wherein at least one axis of a corresponding said at least one first coil is oriented substantially parallel to a surface bounding said gap.

5. A method of providing for sensing a magnetic perturbation of a vehicle as recited in claim 2, wherein at least one axis of a corresponding said at least one first coil is oriented substantially oblique to a surface bounding said gap.

6. A method of providing for sensing a magnetic perturbation of a vehicle as recited in claim 2, wherein said at least one first coil comprises a plurality of first coils, and at least two axes of at least two corresponding said first coils are oriented in different directions.

7. A method of providing for sensing a magnetic perturbation of a vehicle as recited in claim 2, wherein said at least one first coil comprises a ferromagnetic core.

8. A method of providing for sensing a magnetic perturbation of a vehicle as recited in claim 2, wherein said at least one first coil is bonded to a surface bounding said gap.

9. A method of providing for sensing a magnetic perturbation of a vehicle as recited in claim 2, wherein said at least one first coil is operatively coupled to said body or structure of said vehicle with a fastener through a central portion of said at least one first coil.

10. A method of providing for sensing a magnetic perturbation of a vehicle as recited in claim 2, wherein said at least one first coil is located between an outward facing surface of said body or structure of said vehicle and an inward facing surface of a proximate door of said vehicle.

11. A method of providing for sensing a magnetic perturbation of a vehicle as recited in claim 2, wherein at least one said first coil comprises a toroidal helical coil.

12. A method of providing for sensing a magnetic perturbation of a vehicle as recited in claim 2, wherein the operation generating said at least one signal comprises generating a signal responsive to a self-inductance of said at least one first coil.

13. A method of providing for sensing a magnetic perturbation of a vehicle as recited in claim 1, wherein said element of said vehicle comprises a safety restraint system, and the operation of controlling said element comprises controlling the actuation of said safety restraint system responsive to a detection of a crash involving said vehicle body, where said detection is responsive to said at least one signal.

14. A method of providing for sensing a magnetic perturbation of a vehicle as recited in claim 1, wherein said element of said vehicle comprises an element responsive to a door opening condition, and the operation of controlling said element comprises detecting from said at least one signal a door opening state, and controlling said element responsive to said door opening state.

15. A method of providing for sensing a magnetic perturbation of a vehicle as recited in claim 1, further comprising providing for generating at least a portion of said magnetic flux within said vehicle body, wherein the operation of generating at least a portion of said magnetic flux is at a second location with a second coil operatively associated with said body or structure of said vehicle, wherein said second location is distinct from said at least one first location, and the operation of generating at least a portion of said magnetic flux comprises applying a current to said second coil.

16. A method of providing for sensing a magnetic perturbation of a vehicle as recited in claim 15, wherein said second location is selected from one of a location proximate to a B-pillar of said vehicle, a location proximate to an A-pillar of said vehicle, and a location proximate to a C-pillar of said vehicle, and said at least one first location is selected from another of a location proximate to an A-pillar of said vehicle, a location proximate to a C-pillar of said vehicle, and a location proximate to a B-pillar of said vehicle.

17. A method of providing for sensing a magnetic perturbation of a vehicle as recited in claim 15, wherein said second coil is placed within a gap between two portions of said body or structure of said vehicle proximate to said second location.

18. A method of providing for sensing a magnetic perturbation of a vehicle as recited in claim 15, wherein said second coil is placed around a component of said vehicle proximate to said second location, wherein said component is either a hinge or an element of a door latch mechanism.

19. A method of providing for sensing a magnetic perturbation of a vehicle as recited in claim 15, wherein the operation of generating said at least one signal comprises generating a signal responsive to said at least a portion of said magnetic flux generated by said second coil.

20. A magnetic crash sensing system of a vehicle, comprising:
 a first coil at a first location of the vehicle;
 a plurality of magnetic sensing elements at a plurality of second locations of the vehicle, wherein said first location is selected from one of a location proximate to a B-pillar of said vehicle, a location proximate to an A-pillar of said vehicle, and a location proximate to a C-pillar of said vehicle, and said plurality of second locations are selected from another of a location proximate to an A-pillar of said vehicle, a location proximate to a C-pillar of said vehicle, and a location proximate to a B-pillar of said vehicle;
 a time varying signal applied to said first coil, wherein said first coil generates magnetic flux within a body or structure of said vehicle responsive to said time varying signal; and
 a processor operatively associated with said plurality of magnetic sensing elements, wherein said processor generates a signal responsive to a perturbation of said vehicle responsive to at least one of a plurality of signals from said corresponding plurality of magnetic sensing elements.

* * * * *